US012162380B2

(12) United States Patent
Sirois et al.

(10) Patent No.: US 12,162,380 B2
(45) Date of Patent: Dec. 10, 2024

(54) FORCE BIAS DEVICE FOR AN ACTUATOR SYSTEM

(71) Applicant: ClearMotion Acquisition I LLC, Billerica, MA (US)

(72) Inventors: Jason Steven Sirois, Atkinson, NH (US); Zachary Edward Butner, Atlanta, GA (US); Mario Flores Alanis, Cambridge, MA (US); Marco Giovanardi, Melrose, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 275 days.

(21) Appl. No.: 17/779,315

(22) PCT Filed: Nov. 25, 2020

(86) PCT No.: PCT/US2020/062198
§ 371 (c)(1),
(2) Date: May 24, 2022

(87) PCT Pub. No.: WO2021/108529
PCT Pub. Date: Jun. 3, 2021

(65) Prior Publication Data
US 2023/0001826 A1 Jan. 5, 2023

Related U.S. Application Data

(60) Provisional application No. 63/030,196, filed on May 26, 2020, provisional application No. 62/939,984, filed on Nov. 25, 2019.

(51) Int. Cl.
*B60N 2/02* (2006.01)
*B60N 2/50* (2006.01)

(52) U.S. Cl.
CPC ......... *B60N 2/02246* (2023.08); *B60N 2/501* (2013.01); *B60N 2/506* (2013.01)

(58) Field of Classification Search
CPC ........ B60N 2/502; B60N 2/506; B60N 2/501; B60N 2/02246
See application file for complete search history.

(56) References Cited

U.S. PATENT DOCUMENTS

| 4,321,044 A | 3/1982 | Kron |
| 6,059,253 A | 5/2000 | Koutsky et al. |
| (Continued) |

FOREIGN PATENT DOCUMENTS

| CN | 106627287 A | 5/2017 |
| WO | WO 2019/049879 A1 | 3/2019 |

OTHER PUBLICATIONS

International Search Report and Written Opinion in International Application No. PCT/US2020/062198, mailed Feb. 11, 2021.

*Primary Examiner* — Milton Nelson, Jr.
(74) *Attorney, Agent, or Firm* — Wolf, Greenfield & Sacks, P.C.

(57) ABSTRACT

The present disclosure discusses an active seating system that includes a load leveling mechanism. The load leveling mechanism includes a force bias actuator assembly, a roll actuator assembly, a heave actuator assembly, a first torsion rod connected to the force bias actuator and the roll actuator, and a second torsion rod connected to the force bias actuator and the heave actuator. Each of the force bias actuator assembly, roll actuator assembly, and heave actuator assemblies comprises a housing, a DC motor disposed within the housing, and a ball screw with a driveshaft, the driveshaft of the ball screw being coaxial with a rotor of the DC motor.

(Continued)

The active seating system also includes a seat top and an interface configured to mount the seat top to the load leveling mechanism.

36 Claims, 11 Drawing Sheets

(56) References Cited

U.S. PATENT DOCUMENTS

| | | |
|---|---|---|
| 10,373,513 B2 * | 8/2019 | Atluri .................... G09B 9/12 |
| 2011/0089879 A1 | 4/2011 | Duits |
| 2013/0206949 A1 | 8/2013 | Archambault |
| 2018/0001806 A1 | 1/2018 | Lorey |
| 2018/0105082 A1 | 4/2018 | Knox |
| 2019/0315254 A1 | 10/2019 | Tucker et al. |

\* cited by examiner

FORCE BIAS DEVICE FOR AN ACTUATOR SYSTEM

CROSS-REFERENCE TO RELATED APPLICATIONS

This application is a national stage filing under 35 U.S.C. § 371 of International Patent Application Serial No. PCT/US2020/062198, filed Nov. 25, 2020, which claims the benefit under 35 U.S.C. § 119 (e) of U.S. Provisional Application Ser. No. 62/939,984, filed Nov. 25, 2019, and Provisional Application Ser. No. 63/030,196, filed May 26, 2020, the disclosures of each of which are incorporated by reference herein in their entirety.

FIELD OF INVENTION

This invention relates to seat suspension systems for vehicles.

BACKGROUND

In traditional (passive) seating systems, the occupant may be subjected to heave and roll forces while positioned on the seat structure. These forces may create an uncomfortable user experience especially during high amplitudes at moderate frequencies. In an active seating system with one, two, or more degrees of freedom, the occupant may be isolated from these road perturbations by sensing roll, heave and yaw forces and actively counteract these motions to improve the user experience.

SUMMARY

The present disclosure provides a mechanism for an active seating system in which the mass of the occupant, seat structure, cargo, or any combination thereof, may be sensed and/or determined by the active seating system and may be dynamically counteracted such that the active mechanism does not see any additional mass. The active mechanism may include one or more coaxial actuators.

According to a first aspect, the present disclosure discusses an active seating system that includes a load leveling mechanism. The load leveling mechanism includes a force bias actuator assembly, a roll actuator assembly, a heave actuator assembly, a first torsion rod connected to the force bias actuator and the roll actuator, and a second torsion rod connected to the force bias actuator and the heave actuator. The active seating system also includes a seat top and an interface configured to mount the seat top to the load leveling mechanism.

In some implementations, each of the force bias actuator assembly, roll actuator assembly, and heave actuator assemblies comprises a housing, a DC motor disposed within the housing, and a ball screw with a driveshaft, the driveshaft of the ball screw being coaxial with a rotor of the DC motor.

In some implementations, at least one of the force bias actuator, the roll actuator, and the heave actuator are non-backdriveable.

In some implementations, the force bias actuator is configured to wind the first torsion rod and the second torsion rod. In some instances, the force bias actuator is configured to wind the first torsion rod in a clockwise direction and the second torsion rod in a counterclockwise direction.

In some implementations, the force bias actuator is mounted on a floating reference.

In some implementations, the force bias actuator is configured to apply a preload to return a running average force output of the roll actuator and the heave actuator to zero.

In some implementations, at least one of the force bias actuator assembly, the roll actuator assembly, or the heave actuator assembly occupies a volume of between approximately 400 cc to 600 cc as the actuator assembly moves between its compressed state and its extended state.

In some implementations, an effective spring rate at the seat top is configured to be between approximately 25 N/mm and 90 N/mm.

In some implementations, the seat top and an occupant positioned on the seat top have a mass of approximately 35 kg to 180 kg.

According to another aspect, a load leveling mechanism includes a force bias actuator assembly. The load leveling mechanism also includes a roll actuator assembly. The load leveling mechanism also includes a heave actuator assembly. The load leveling mechanism also includes a first torsion rod connected to the force bias actuator and the roll actuator and a second torsion rod connected to the force bias actuator and the heave actuator. Each of the force bias actuator assembly, roll actuator assembly, and heave actuator assemblies comprises a housing, a DC motor disposed within the housing, and a ball screw with a driveshaft, the driveshaft of the ball screw being coaxial with a rotor of the DC motor.

In some implementations, at least one of the force bias actuator, the roll actuator, and the heave actuator are non-backdriveable.

In some implementations, the force bias actuator is configured to wind the first torsion rod and the second torsion rod. In some instances, the force bias actuator is configured to wind the first torsion rod in a clockwise direction and the second torsion rod in a counterclockwise direction.

In some implementations, the force bias actuator is mounted on a floating reference.

In some implementations, the force bias actuator is configured to apply a preload to return a running average force output of the roll actuator and the heave actuator to zero.

In some implementations, at least one of the force bias actuator assembly, the roll actuator assembly, or the heave actuator assembly occupies a volume of between approximately 400 cc to 600 cc as the actuator assembly moves between its compressed state and its extended state.

In some implementations, the load leveling mechanism has an effective spring rate of between approximately 25 N/mm and 90 N/mm.

A system incorporating aspects of this disclosure may have one or more of the following advantages. A system as described, may provide a compact under-the-seat structure, and does not require the use of an air compressor and an auxiliary storage tank in order to operate unlike prior active seating systems. These auxiliary components require packaging space elsewhere in the vehicle and the addition of an air compressor is often undesirable from an audible noise perspective. Systems as described herein may remove the requirement for a compressor, air supply tank, valving, hoses, etc., and replace it with one electrical motor and static components packaged under the seat.

Using feedback from the main roll and heave actuators, the systems described herein have the ability to sense an amount of spring force required to offset the mass of the seat top and the occupant. Using a combination of torsion bar length, diameter and angle of twist, the system can be designed to cover a wide range of occupant masses, increasing the overall effective of the active seat.

A ball screw nut of an actuator of the system is directly driven by a rotor of the electric motor of the actuator in order to minimize rotational inertia of the system. This setup also provides a compact mechanical arrangement with overall gains in efficiency and noise reduction. By combining a DC motor directly into the actuator, the system becomes much more compact. Additionally, the system provides reductions in total inertias. Sources of lash, inefficiency and audible noise can be eliminated.

The accompanying figures may not be drawn to scale and are intended for non-limiting illustration purposes.

DETAILED DESCRIPTION

In traditional (passive) seating systems, the occupant may be subjected to heave and roll forces while positioned on the seat structure. These forces may create an uncomfortable user experience especially during high amplitudes at moderate frequencies. In an active seating system with one, two, or more degrees of freedom, the occupant may be isolated from these road perturbations as the active seating system senses roll, heave and yaw forces and actively counteracts motions resulting from these forces to improve the user experience (e.g., improve comfort, decrease motion sickness, etc.). In some embodiments of an active seating system, the actuation mechanism (e.g., a frame including one or more active suspension actuators) may need to statically support the mass of the occupant and the mass of the seat structure. This objective can often be achieved by commanding a bias force from the active seating system. Biasing an active seat at an appropriate nominal position reduces power consumption and improves efficiency relative to a seat where the same function is achieved by using the active suspension actuators.

Figure 1:
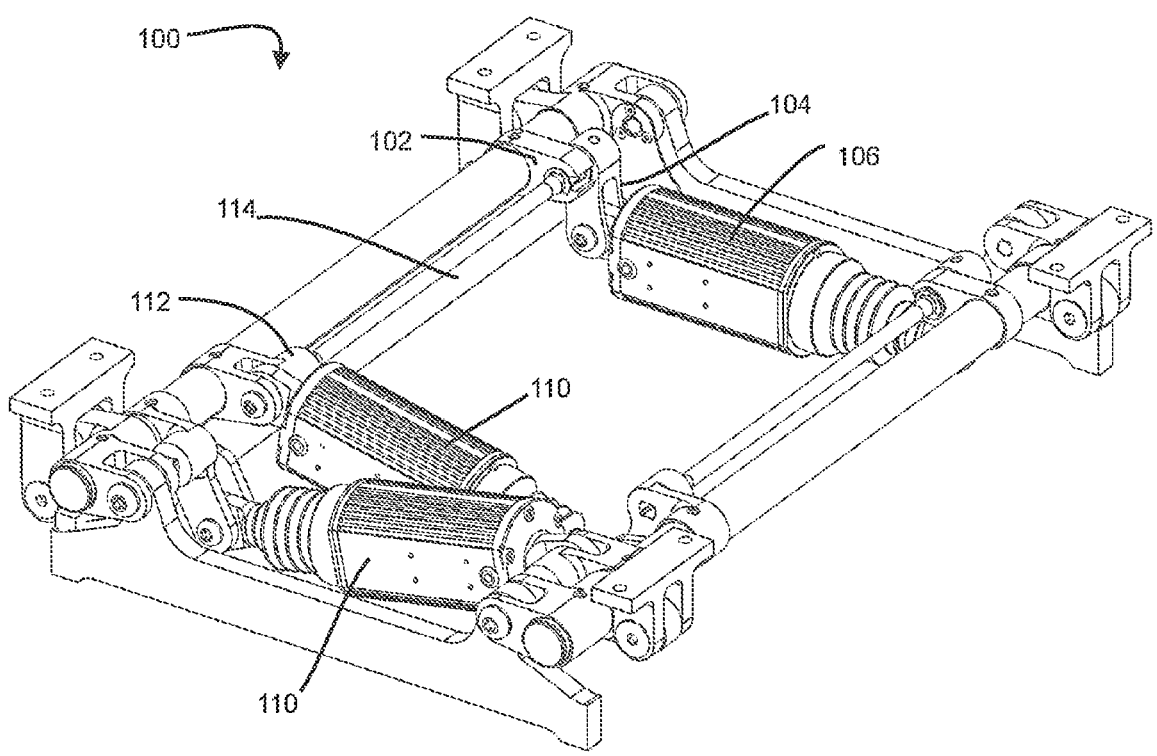
FIG. 1 shows an embodiment of an adaptive load balancing mechanism in the context of an active seat mechanism.
Figure 2:
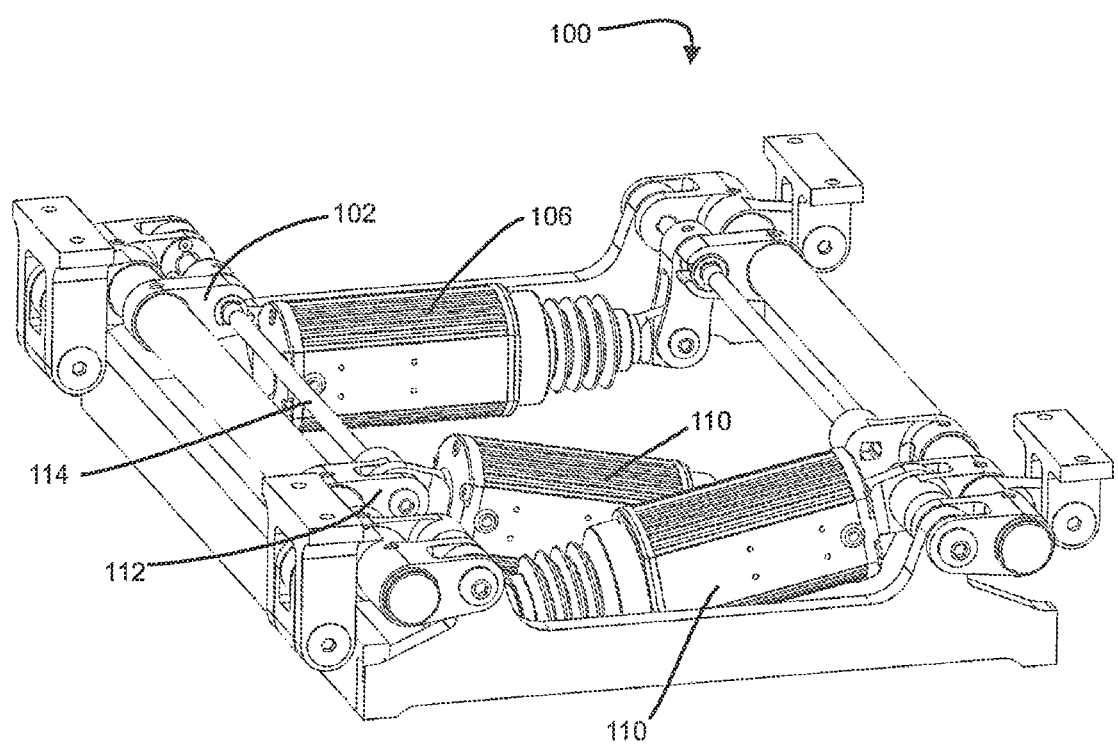
FIG. 2 shows another view of the adaptive load balancing mechanism of FIG. 1.

FIGS. 1 and 2 show two views of a dynamically adaptable bias sub-system 100 that is configured to sense, measure, and counteract the addition or subtraction of mass (e.g., from an occupant entering or exiting the seat) beyond the nominal mass (e.g., of a seat top). Applying a nominal bias force allows the occupant and seat structure to be located at an appropriate position for performing active seating (e.g., isolation, inducing motion) while simultaneously reducing or eliminating additional power demand that would be required if the active seating mechanism (e.g., active suspension actuators) were used to perform this function. In some embodiments, system performance and/or efficiency may be improved by incorporating this functionality. The dynamically adaptable bias sub-system 100 may be scalable and may be configured and tuned to operate in a specific range of masses depending on the particular application. Possible tunable parameters include lever arm ratios, ball screw pitch, diameter and/or length of torsion bars, amount of "wind up", which all change the spring rate of the system. In some embodiments described herein, it is advantageous to keep the spring rate of the system as low as possible. Different mechanical systems (e.g., hydraulically actuated, magnetically actuated, etc.) may also be used. Each varying mechanical system has various tunable features to drive down system spring rate.

During operation, in some embodiments, the active seating mechanism (including roll and heave actuators 110) may continuously monitor and command a seat position and/or orientation such that the seat may be positioned for active isolation. Any change in position due to external inputs may be sensed and measured by means of electrical power consumption and/or a change in relative seating position. In some embodiments, by measuring the change in power or position, the active seating mechanism 100 may determine the change (e.g., increase or decrease) of mass on the system. The mass on the system may include a mass of the seat top, a mass of an occupant of the seat, a mass of an object placed on the seat, etc. This mass differential may be communicated to the dynamic load-balancing mechanism 106 and the dynamic load-balancing mechanism 106 may compensate for the mass change such that the active seating mechanism does not consume additional power in order to "hold" the occupant at a neutral position.

The system includes one or more torsion bars/rods 114 and one or more actuators configured to actuate these rods to increase or decrease the nominal bias force applied to the seat. Other embodiments, which may employ air springs, coil springs (in series or in parallel) are contemplated and the disclosure is not so limited. When commanded by the system, one or more electrical motors/actuators may be used to drive a mechanical gear train. This mechanical gear train may be used to provide a high mechanical advantage in order to "wind-up" one or more torsion rods (e.g., torsion rod 114) within the system. In some embodiments, the mechanical gear train may include worm gears, a series of gears, levers, etc. Due to the high mechanical advantage, the system may be inherently non-backdriveable or effectively non-backdriveable, which may allow the motors of the roll and heave actuators 110 to remain unpowered once the desired motion is achieved without the need to supply continuous energy. The system monitors the force outputs of the roll and heave actuators 110. A running average force output of zero means that the roll and heave actuators 110 are not activating to account for mass on the seat. When the running average force output is not zero, the force bias actuator may apply a preload to account for the mass of the seat (and any occupants/objects) to bring the running average force output back to zero. Changing the preload on the seat via the force bias mechanism can be done slowly (e.g., on the order of seconds or minutes).

Figure 3:
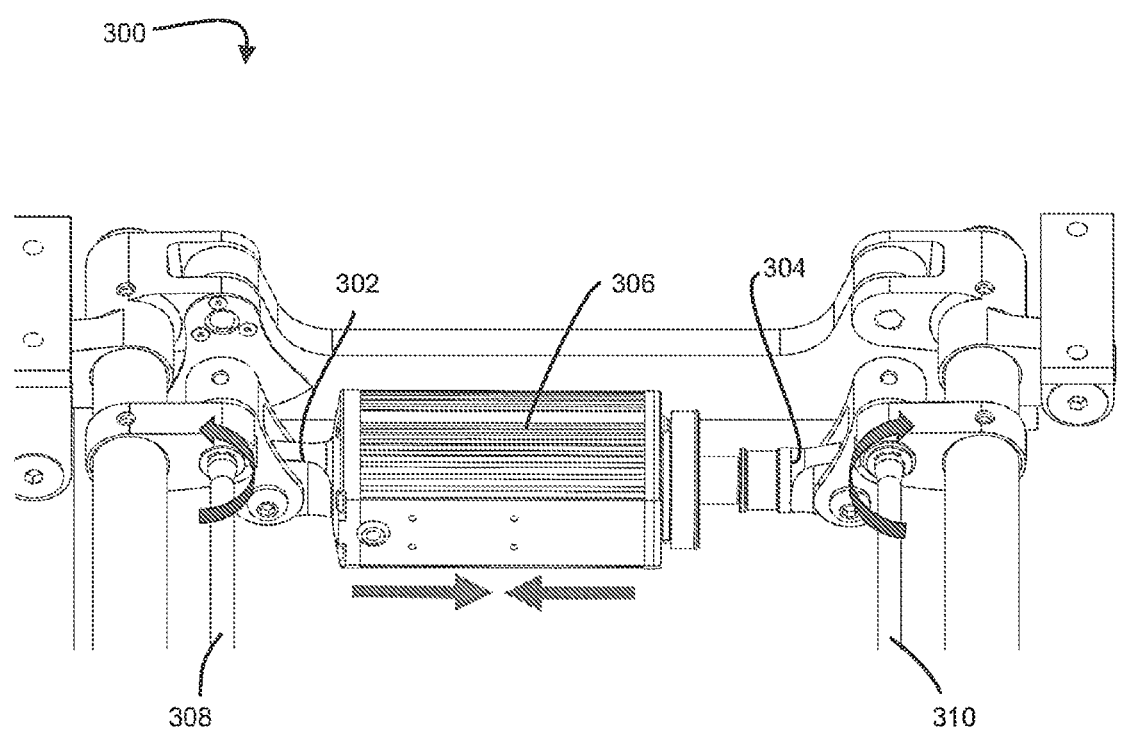
FIG. 3 shows functionality of the adaptive load balancing mechanism of FIG. 1 when the force bias actuator shortens.

In the embodiment shown in FIGS. 1-3, the system utilizes a single force bias motor/actuator 106. The force bias actuator 106 is connected to the torsion bar 114 by actuator arms and pivot brackets, e.g., pivot bracket 102 and actuator arm 104. The torsion bars are connected to the roll and heave actuators at anchor points, e.g., torsion bar 114 connected at anchor point 112. The force bias actuator 106 is arranged such that it has the ability to "wind" two separate torsion rods (e.g., torsion rod 114 in FIG. 1), which will be discussed in more detail with respect to FIGS. 3 and 4.

FIG. 3 shows the functionality of a dynamically adaptable bias sub-system 300 as a force bias actuator 306 shortens. As the force bias actuator 306 shortens, a rod end 302 and an end cap 304 of the actuator 306 move closer together, thereby twisting a first torsion rod 308 counterclockwise and twisting a second torsion rod 310 clockwise.

Figure 4:
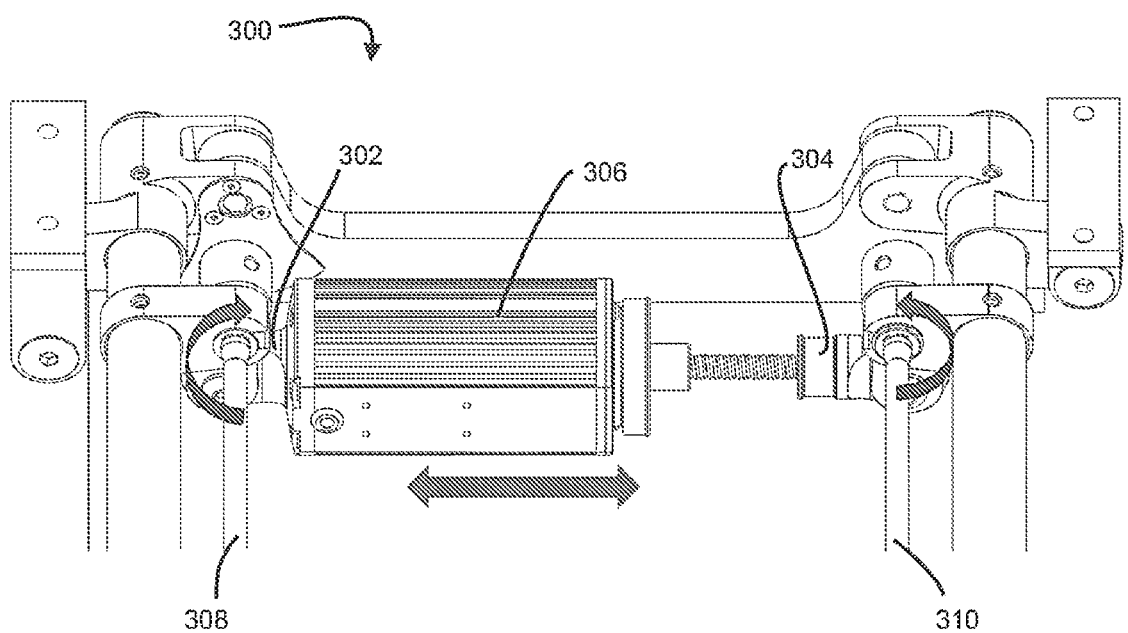
FIG. 4 shows functionality of the adaptive load balancing mechanism of FIG. 1 when the force bias actuator lengthens.

FIG. 4 shows the functionality of the dynamically adaptable bias sub-system 300 as the force bias actuator 306 lengthens. As the force bias actuator 306 lengthens, the rod end 302 and the end cap 304 of the force bias actuator 306 move farther apart, thereby twisting the first torsion rod 308 clockwise and twisting the second torsion rod 310 counterclockwise.

By varying the distance between the rod end 302 of the force bias actuator 306 and the end cap 304 of the actuator, a torsional force is applied to torsion rods 308, 310. The amount of torsional resistance that the system can provide may be dictated by the diameter, length, and angle of twist of the torsion rods 308, 310. As such, the system may be scaled and sized appropriately for a particular application or range of adjustment desired. For example, in certain applications, the range of occupant mass able to be biased may be shifted to accommodate higher percentile masses (e.g., heavier occupants) or a limited range of active seat motion. As such, physical parameters of the torsion rods 308, 310 may be altered to optimize performance for that particular application.

It should be noted that if the driving mechanism (e.g., force bias actuator 306) of the torsion bars 308, 310 is mounted on a "floating" reference, having the ability to move proportional with roll motions, the driving mechanism will not contribute an additive spring-rate during roll events of the active seating mechanism (e.g., roll and heave actuators 110 shown in FIGS. 1 and 2). Heave events have an additive or subtractive force from the spring-rate. This setup may have desirable effects, such as for example, to reduce the force required to overcome the spring stiffness of the torsion rods 308, 310 or minimize the total spring "wind-up" during operation.

Figure 5:
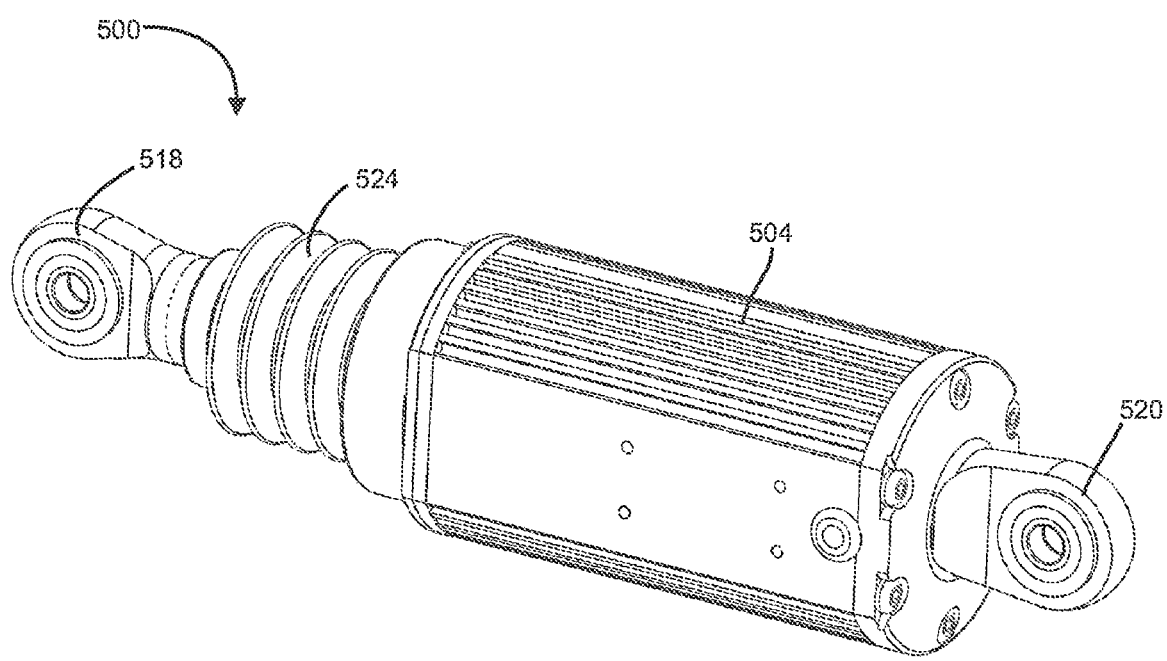
FIG. 5 shows a first view of a coaxial actuator assembly of the adaptive load balancing mechanism of FIG. 1.
Figure 6:
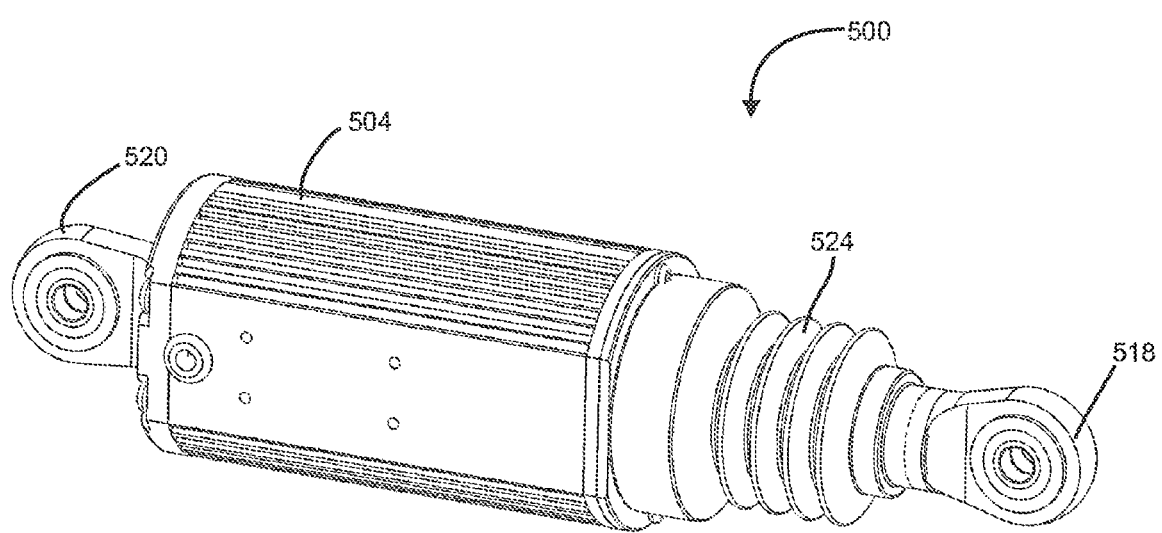
FIG. 6 shows a second view of the coaxial actuator assembly of FIG. 5.
Figure 7:
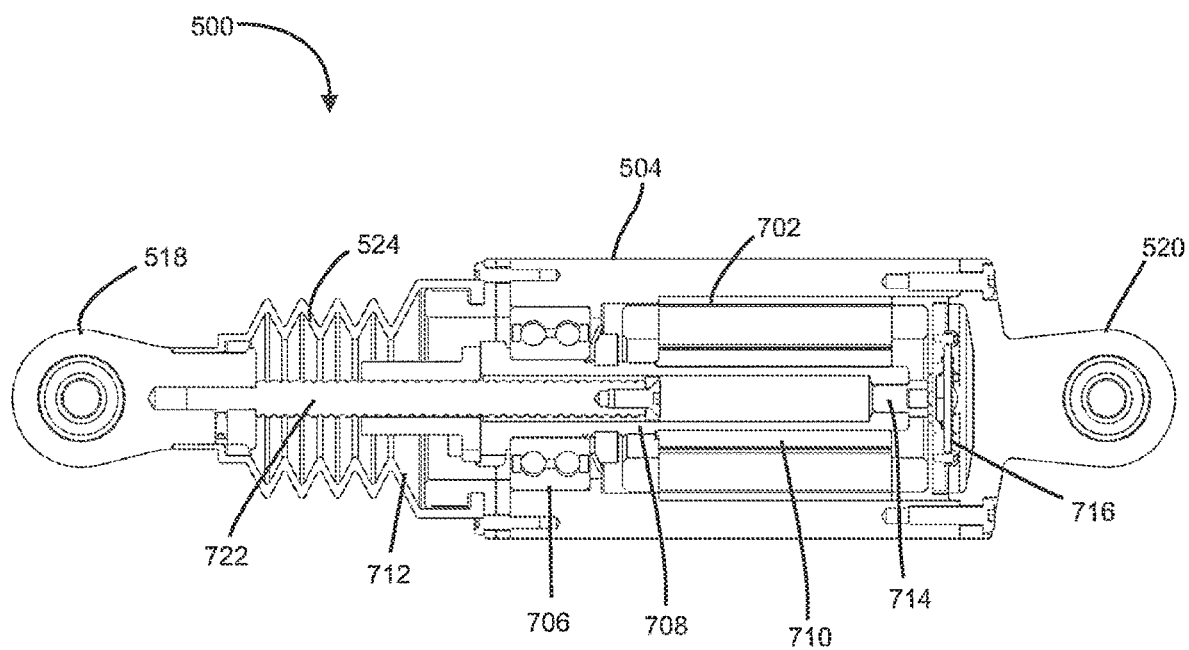
FIG. 7 shows a cross-sectional view of the coaxial actuator assembly of FIG. 5.

FIGS. 5 and 6 show two views of a coaxial actuator assembly 500 of the adaptive load balancing mechanism of FIG. 1. FIG. 7 shows a section view of the coaxial actuator assembly 500 of FIGS. 5 and 6 and its mechanical arrangement. The coaxial actuator assembly has a rode end 518 and an end cap 520 configured to attach the coaxial actuator assembly 500 within an active seat suspension system (see FIGS. 1-4). In this embodiment, a brushless DC motor stator 702 is assembled in a stator housing 504. The stator housing 504 serves provides a location for the motor stator 702, a means of heat dissipation for the motor stator 702, and a structural load path for the coaxial actuator 500. Inside the stator housing 702, a single angular contact bearing 706 is arranged to provide both radial and thrust loading capacity as well as provide high moment resistance for a cantilevered shaft 708, which is supported by the single actuator contact bearing 706. The cantilevered shaft 708, supported by the angular contact bearing 706, provides a direct connection to a rotor assembly 710 of the brushless DC motor and the ball nut assembly 712. An integrated encoder magnet 714, which is used to sense both shaft position and velocity via a magnetic encoder 716 housed in a rear section of the stator housing 504. A ball screw is coaxial with the rotor assembly 710 of the brushless DC motor and is at least partially surrounded by a dust bellows 524.

In some embodiments, the coaxial actuator assembly occupies a volume of between approximately 400 cc to 600 cc as the coaxial actuator assembly moves between its compressed state and its extended state.

The inventor has recognized that an active seat suspension system could become more compact by removing the mechanical gear train between the motor and the ball screw mechanism, which may be found in prior systems, and instead driving the ball screw nut directly by the motor's rotor. By arranging these components in a coaxial manner, many additional components are omitted, improving efficiency and decreasing system cost.

Additionally, the total system inertia is less than prior active seat suspension systems, by approximately 25%, and can be expressed as:

$$J\_Total = J\_M + J\_BN \qquad \text{(Equation 1)}$$

Where:
J_M=Mass Moment of Inertia for Motor
J_BN=Mass Moment of Inertia for Ball Nut & Shaft Assembly Comparing this to previous systems, any additional inertia of the present system is directly connected to the motor's rotor and thus accelerates at the same rate.

While the present system is laid out such that it utilizes one motor/actuator, one actuator could be substituted for two if packaging or performance becomes a concern. Likewise, the present system is configured to use two separate torsion rods to store spring energy. There is a potential to combine the torsion rods into one unit in order to reduce packaging space if desired.

In its current configuration, the system design is scalable such that if a high peak force is required, one could increase the ball screw/lead screw pitch at the expense of linear velocity. Likewise, increased linear velocity can be achieved by decreasing the ball screw/lead screw pitch at the expense of linear force. If a compromise cannot be achieved by varying the screw pitch, the motor components can be scaled by altering the frame size of the motor, the rotor length or a combination of the two.

Referring to the embodiments shown in FIGS. 1-7, the dynamically adaptable bias sub-system operates with a floating reference mechanism. Torsion springs are effectively arranged to operate in series, where the springs are kinematically arranged in an end-to-end configuration. This results in the effective spring rate to be defined as $$\frac{1}{K\_\text{effective}} = \frac{1}{K_1} + \frac{1}{K_2} \frac{1}{K_n}.$$

This arrangement can provide a method to achieve a system with a relatively low spring rate if desired. This has added benefits as the energy to "fight" through the spring rate during heave events is less than for a fixed reference mechanism. In general, this system can be designed to accommodate occupant (and/or seat top) masses that range from 35 kg to 180 kg. The mechanism may be tuned and adjusted to have an effective spring rate between 25 N/mm and 90 N/mm. In some implementations, an effective spring rate at the seat top is between approximately 30 N/mm and 40 N/mm. In some implementations, an effective spring rate at the seat top is approximately 38 N/mm.

Figure 8:
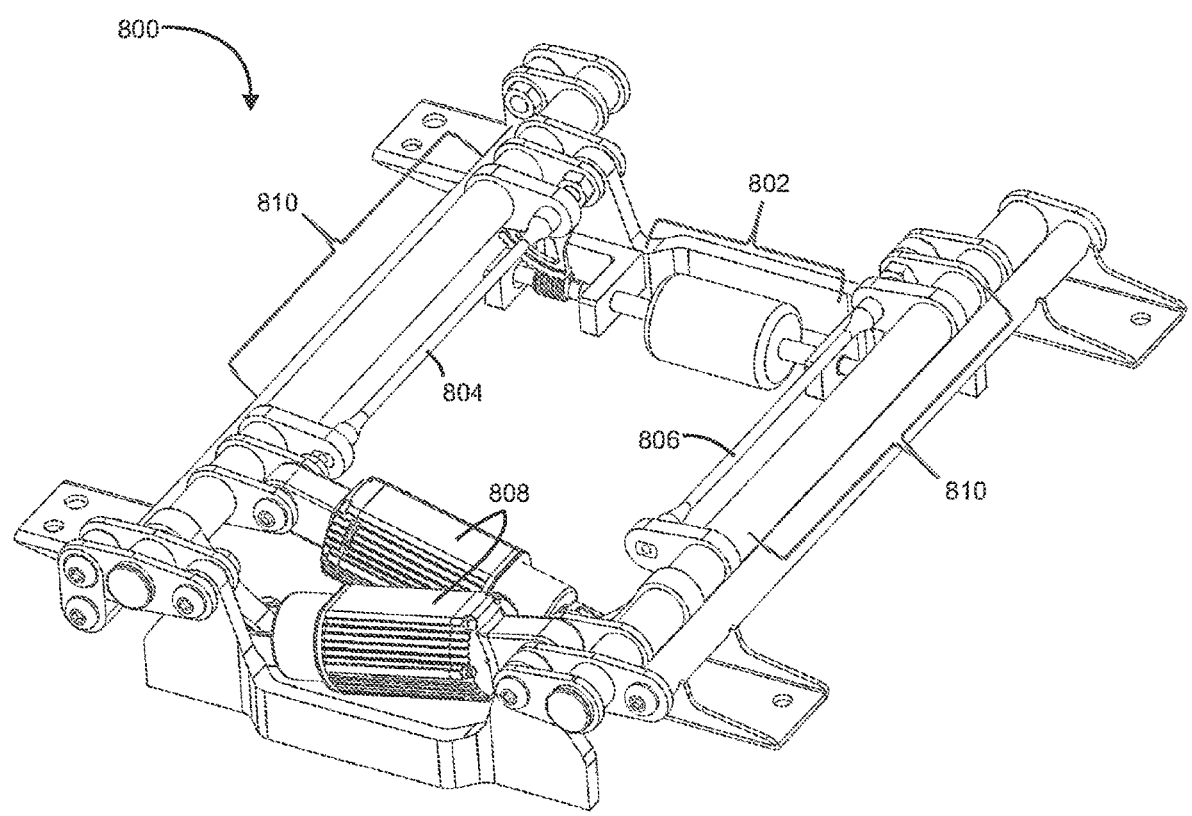
FIG. 8 shows an embodiment of an adaptive load balancing mechanism using a torsion bar.
Figure 9:
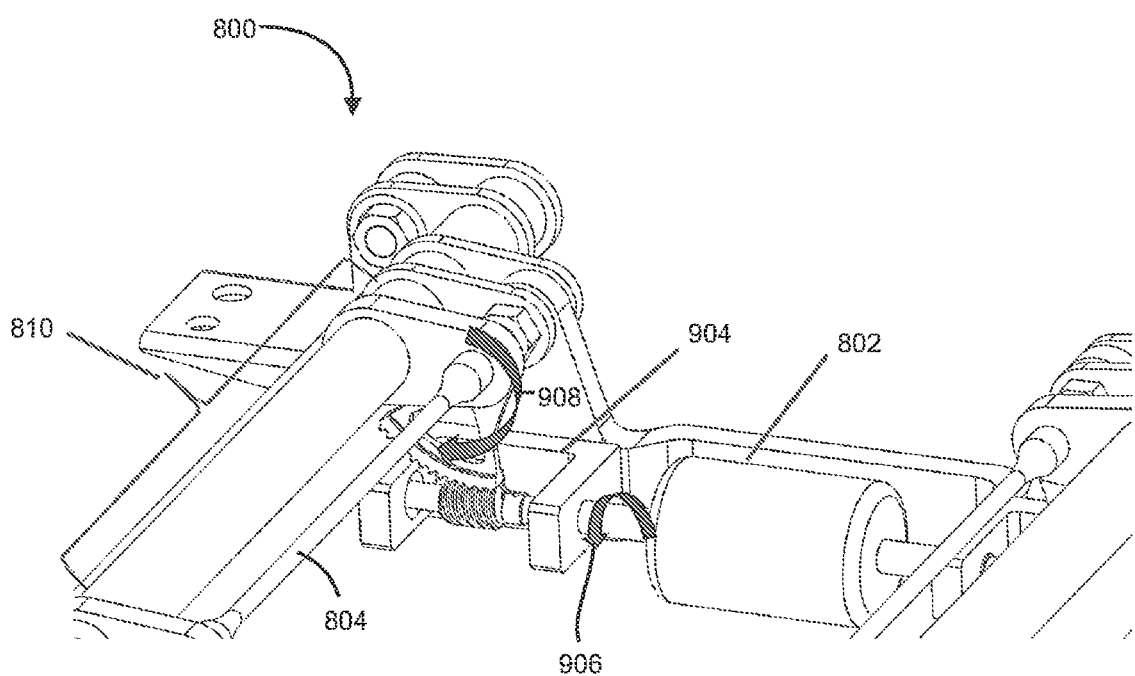
FIG. 9 shows the functionality of an embodiment of an adaptive load balancing mechanism.

Referring to FIGS. 8 and 9, an adaptive load balancing system 800 may include one or more torsion bars 804, 806 and one or more means of actuating these rods to increase or decrease the nominal bias force applied to a seat (which may be positioned atop the adaptive load balancing system). As shown in FIG. 9, when commanded (e.g., by a controller (not shown)), one or more electrical motors 802 may be used to drive a mechanical gear train 810 (here, including a worm-gear mechanism 904). This gear train may be used to provide a high mechanical advantage in order to "wind-up" (shown by arrows 906, 908) one or more torsion rods (e.g., torsion rod 804) within the system 800. Due to the high mechanical advantage, the system 800 may be inherently or effectively non-backdriveable. This may allow the actuation motors 808 to remain unpowered once the desired motion is achieved without the need to supply continuous consumption of energy.

Figure 10:
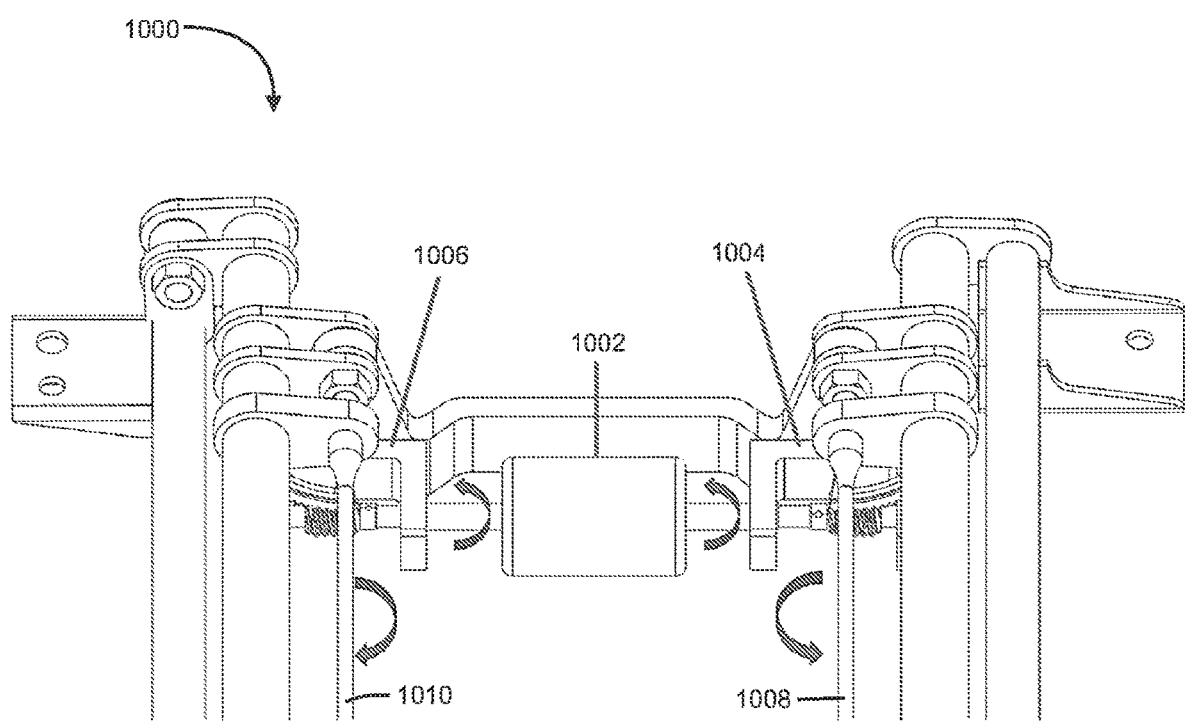
FIG. 10 shows an embodiment of an adaptive load balancing mechanism using a single motor to drive two torsion spring systems.

Referring to FIG. 10, an adaptive load balancing system 1000 can be designed such that one motor (e.g., a dual-output shaft motor 1002) has the ability to drive two gear trains simultaneously by utilizing a left-hand pitch worm-gear mechanism 1004 and right-hand pitch worm-gear mechanism 1006 to "wind" (shown by arrows of FIG. 10) to separate torsion rods 1008 and 1010, respectively.

The amount of torsional resistance that the system can provide may be dictated by the diameter, length, and angle of twist of the torsion rods. As such, the system may be scaled and sized appropriately for a particular application or range of adjustment desired. For example, in certain applications, the range of occupant mass may be bias to accommodate higher masses or a limited range of active seat motion. As such, physical parameters of the torsion rods may be altered to optimize performance for that particular application.

Figure 11:
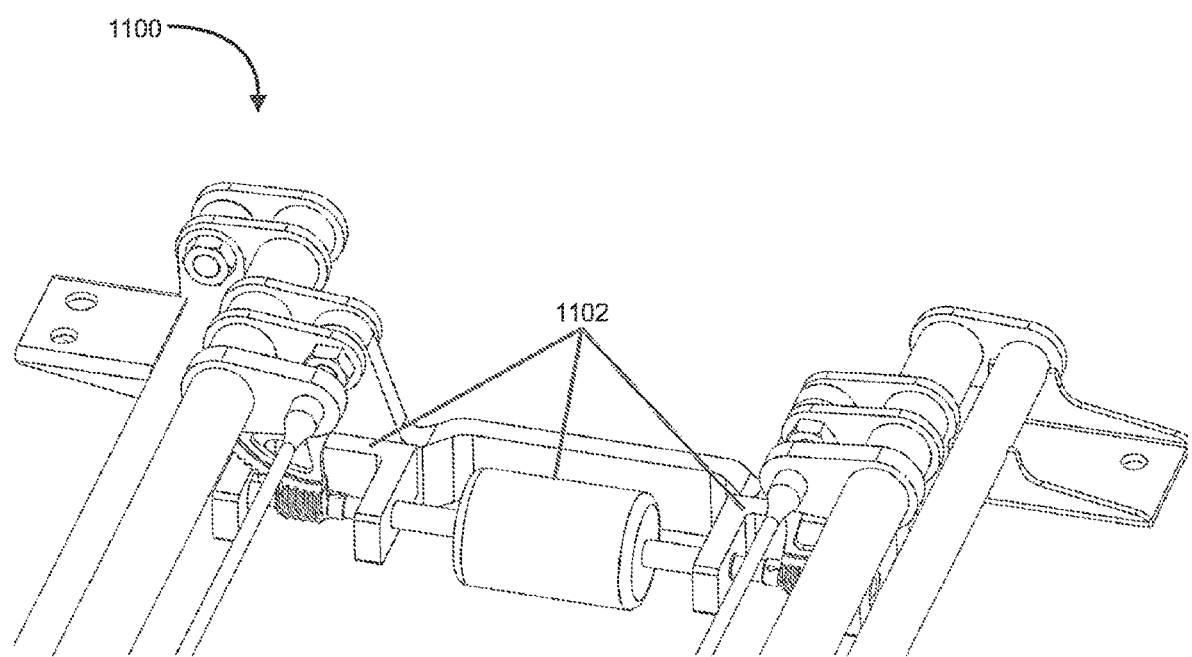
FIG. 11 illustrates an embodiment of a gear train mechanism mounting to a fixed reference frame.

Referring to FIG. 11, it should be noted that if the a system 1100 includes a driving mechanism of the torsion bars that is mounted on a fixed reference, such as a non-movable frame structure 1102, the driving mechanism may provide an additive spring rate during roll and heave events of the active seating mechanism. This may have desirable effects, such as for example, to have a system with the ability to "self-center" or automatically return to a known neutral position during an unpowered event.

Referring to the embodiments shown in FIGS. 8-11, the adaptive load balancing system operates with a fixed reference mechanism. Torsion springs are effectively arranged to operate in parallel, where each side operates independently and their spring rates are additive (i.e., $K_{effective} = K_1 + K_2 + K_u$). This arrangement can provide a method to achieve a system with a relatively high spring rate if desired, which can accommodate heavier masses (e.g., occupant, seat, external force, etc.) In general, this system can be designed to accommodate occupant (and/or seat top) masses that range from 35 kg to 180 kg. The mechanism may be tuned and adjusted to have an effective spring rate between 25 N/mm and 90 N/mm. In some implementations, an effective spring rate at the seat top is between approximately 30 N/mm and 40 N/mm. In some implementations, an effective spring rate at the seat top is approximately 38 N/mm.

The invention claimed is:

1. An active seat suspension system, comprising:
   a load leveling mechanism, comprising:
      a force bias actuator assembly comprising a force bias actuator;
      a roll actuator assembly comprising a roll actuator;
      a heave actuator assembly comprising a heave actuator;
      a first torsion rod connected to the force bias actuator and the roll actuator; and
      a second torsion rod connected to the force bias actuator and the heave actuator;
   a seat top; and
   an interface configured to mount the seat top to the load leveling mechanism;
   wherein each of the force bias actuator assembly, the roll actuator assembly, and the heave actuator assembly comprises a housing, a DC motor disposed within the housing, and a ball screw with a driveshaft, the driveshaft of the ball screw being coaxial with a rotor of the DC motor.

2. The active seat suspension system of claim 1, wherein the load leveling mechanism is configured to support a mass of approximately 35 kg to 180 kg.

3. The active seat suspension system of claim 1, wherein at least one of the force bias actuator, the roll actuator, and the heave actuator are non-backdriveable.

4. The active seat suspension system of claim 1, wherein the force bias actuator is configured to wind the first torsion rod and the second torsion rod.

5. The active seat suspension system of claim 4, wherein the force bias actuator is configured to wind the first torsion rod in a clockwise direction and the second torsion rod in a counterclockwise direction.

6. The active seat suspension system of claim 1, wherein the force bias actuator is mounted on a floating reference.

7. The active seat suspension system of claim 1, wherein the force bias actuator is configured to apply a preload to return a running average force output of the roll actuator and the heave actuator to zero.

8. The active seat suspension system of claim 1, wherein at least one selected from the force bias actuator assembly, the roll actuator assembly, and the heave actuator assembly occupies a volume of between approximately 400 cc to 600 cc as the at least one selected from the force bias actuator assembly, the roll actuator assembly, and the heave actuator assembly moves between a compressed state and an extended state.

9. The active seat suspension system of claim 1, wherein an effective spring rate at the seat top is configured to be between approximately 25 N/mm and 90 N/mm.

10. A load leveling mechanism, comprising:
    a force bias actuator assembly comprising a force bias actuator;
    a roll actuator assembly comprising a roll actuator;
    a heave actuator assembly comprising a heave actuator;
    a first torsion rod connected to the force bias actuator and the roll actuator; and
    a second torsion rod connected to the force bias actuator and the heave actuator;
    wherein each of the force bias actuator assembly, the roll actuator assembly, and the heave actuator assembly comprises a housing, a DC motor disposed within the housing, and a ball screw with a driveshaft, the driveshaft of the ball screw being coaxial with a rotor of the DC motor.

11. The load leveling mechanism of claim 10, wherein the load leveling mechanism has an effective spring rate of between approximately 25 N/mm and 90 N/mm.

12. The load leveling mechanism of claim 10, wherein at least one of the force bias actuator, the roll actuator, and the heave actuator are non-backdriveable.

13. The load leveling mechanism of claim 10, wherein the force bias actuator is configured to wind the first torsion rod and the second torsion rod.

14. The load leveling mechanism of claim 13, wherein the force bias actuator is configured to wind the first torsion rod in a clockwise direction and the second torsion rod in a counterclockwise direction.

15. The load leveling mechanism of claim 10, wherein the force bias actuator is mounted on a floating reference.

16. The load leveling mechanism of claim 10, wherein the force bias actuator is configured to apply a preload to return a running average force output of the roll actuator and the heave actuator to zero.

17. The load leveling mechanism of claim 10, wherein at least one selected from the force bias actuator assembly, the roll actuator assembly, and the heave actuator assembly occupies a volume of between approximately 400 cc to 600 cc as the at least one selected from the force bias actuator assembly, the roll actuator assembly, and the heave actuator assembly moves between its compressed state and its extended state.

18. An active seat suspension system, comprising:
   a load leveling mechanism, comprising:
      a force bias actuator assembly comprising a force bias actuator;
      a roll actuator assembly comprising a roll actuator;
      a heave actuator assembly comprising a heave actuator;
      a first torsion rod connected to the force bias actuator and the roll actuator; and
      a second torsion rod connected to the force bias actuator and the heave actuator;
   a seat top; and
      an interface configured to mount the seat top to the load leveling mechanism, wherein the force bias actuator is mounted on a floating reference.

19. The active seat suspension system of claim 18, wherein the force bias actuator is configured to move proportional with roll motions.

20. The active seat suspension system of claim 18, wherein each of the force bias actuator assembly, roll actuator assembly, and heave actuator assemblies comprises a housing, a DC motor disposed within the housing, and a ball screw with a driveshaft, the driveshaft of the ball screw being coaxial with a rotor of the DC motor.

21. The active seat suspension system of claim 18, wherein at least one of the force bias actuator, the roll actuator, and the heave actuator are non-backdriveable.

22. The active seat suspension system of claim 18, wherein the force bias actuator is configured to wind the first torsion rod and the second torsion rod.

23. The active seat suspension system of claim 22, wherein the force bias actuator is configured to wind the first torsion rod in a clockwise direction and the second torsion rod in a counterclockwise direction.

24. The active seat suspension system of claim 18, wherein the force bias actuator is configured to apply a preload to return a running average force output of the roll actuator and the heave actuator to zero.

25. The active seat suspension system of claim 18, wherein at least one selected from the force bias actuator assembly, the roll actuator assembly, and the heave actuator assembly occupies a volume of between approximately 400 cc to 600 cc as the at least one selected from the force bias actuator assembly, the roll actuator assembly, and the heave actuator assembly moves between its compressed state and its extended state.

26. The active seat suspension system of claim 18, wherein an effective spring rate at the seat top is configured to be between approximately 25 N/mm and 90 N/mm.

27. The active seat suspension system of claim 18, wherein the load leveling mechanism is configured to support a mass of approximately 35 kg to 180 kg.

28. An active seat suspension system, comprising:
   a load leveling mechanism, comprising:
      a force bias actuator assembly comprising a force bias actuator;
      a roll actuator assembly comprising a roll actuator;
      a heave actuator assembly comprising a heave actuator;
      a first torsion rod connected to the force bias actuator and the roll actuator;
      a second torsion rod connected to the force bias actuator and the heave actuator;
   a seat top; and
      an interface configured to mount the seat top to the load leveling mechanism, wherein the force bias actuator is configured to apply a preload to return a running average force output of the roll actuator and the heave actuator to zero.

29. The active seat suspension system of claim 28, wherein the load leveling mechanism is configured to support a mass of approximately 35 kg to 180 kg.

30. The active seat suspension system of claim 28, wherein each of the force bias actuator assembly, roll actuator assembly, and heave actuator assemblies comprises a housing, a DC motor disposed within the housing, and a ball screw with a driveshaft, the driveshaft of the ball screw being coaxial with a rotor of the DC motor.

31. The active seat suspension system of claim 28, wherein at least one of the force bias actuator, the roll actuator, and the heave actuator are non-backdriveable.

32. The active seat suspension system of claim 28, wherein the force bias actuator is configured to wind the first torsion rod and the second torsion rod.

33. The active seat suspension system of claim 32, wherein the force bias actuator is configured to wind the first torsion rod in a clockwise direction and the second torsion rod in a counterclockwise direction.

34. The active seat suspension system of claim 28, wherein the force bias actuator is mounted on a floating reference.

35. The active seat suspension system of claim 28, wherein at least one selected from the force bias actuator assembly, the roll actuator assembly, and the heave actuator assembly occupies a volume of between approximately 400 cc to 600 cc as the at least one selected from the force bias actuator assembly, the roll actuator assembly, and the heave actuator assembly moves between its compressed state and its extended state.

36. The active seat suspension system of claim 28, wherein an effective spring rate at the seat top is configured to be between approximately 25 N/mm and 90 N/mm.

* * * * *